R. HOLMAN.
ROASTER.
APPLICATION FILED APR. 28, 1913.
1,111,461.
Patented Sept. 22, 1914.
2 SHEETS—SHEET 1.
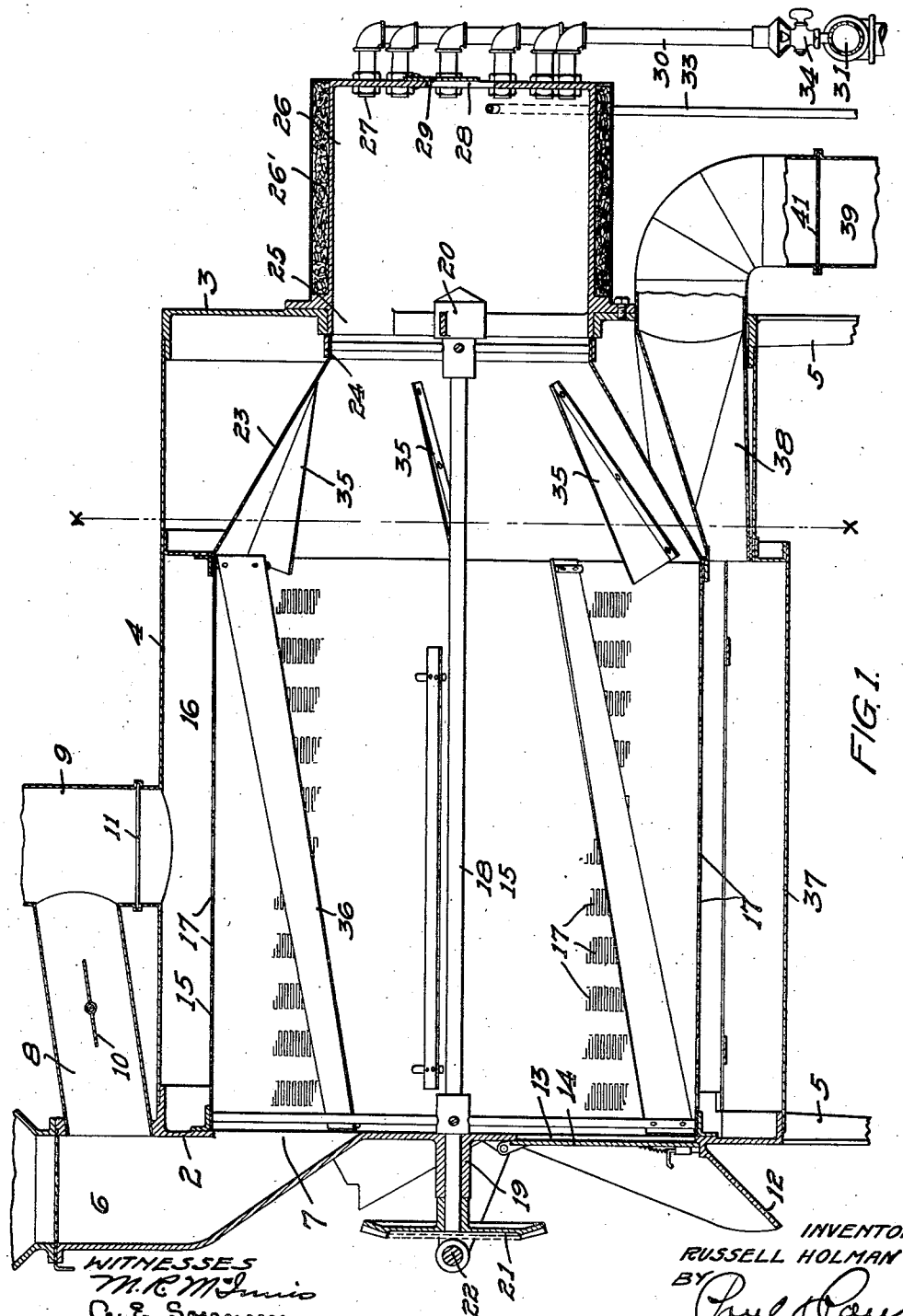
FIG.1.
INVENTOR
RUSSELL HOLMAN
BY 
ATTORNEYS
WITNESSES

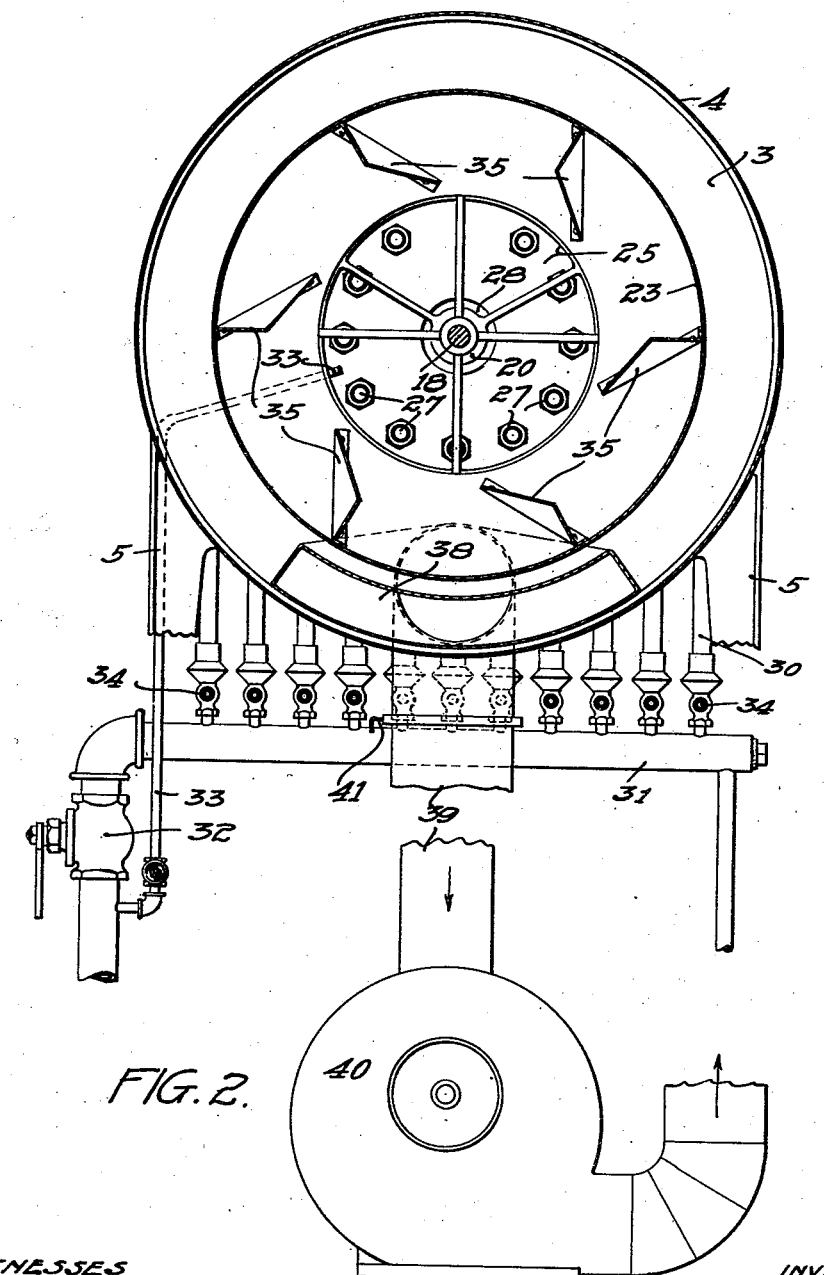

UNITED STATES PATENT OFFICE.

RUSSELL HOLMAN, OF MINNEAPOLIS, MINNESOTA.

ROASTER.

1,111,461.  Specification of Letters Patent.  Patented Sept. 22, 1914.

Application filed April 28, 1913. Serial No. 764,095.

*To all whom it may concern:*

Be it known that I, RUSSELL HOLMAN, citizen of the United States, resident of Minneapolis, county of Hennepin, State of Minnesota, have invented certain new and useful Improvements in Roasters, of which the following is a specification.

My invention relates to an apparatus for roasting purposes, generally and particularly adapted for roasting coffee.

The object of my invention is to improve the apparatus shown and described in my pending application for Letters Patent of the United States filed January 3, 1913, Serial No. 739,970.

The invention consists generally in various constructions and combinations, all as hereinafter described and particularly pointed out in the claims.

In the accompanying drawings forming part of this specification, Figure 1 is a longitudinal sectional view of a roaster embodying my invention, Fig. 2 is a transverse vertical sectional view on the line $x$—$x$ of Fig. 1.

In the drawing, 2 and 3 represent suitable cast heads, between which is a casing 4, forming with said heads a stationary jacket in which the roaster proper is arranged. The heads 2 and 3 are supported by suitable means, such as legs 5. The head 2 has a hopper 6 2 communicating through an opening 7 with the interior of the casing. Said hopper also communicates through a pipe 8 with a vent pipe 9 provided preferably in the top of the casing 4. Suitable dampers 10 and 11 are mounted in the pipes 8 and 9 for controlling the flow of the hot air from the casing during the roasting operation and regulating the circulation of the cold air during the process of cooling the coffee. In the lower part of the head 2 is a spout 12 communicating with a discharge opening 13 normally closed by a hinged door 14. When this door is opened the coffee may be discharged from the roasting cylinder.

Within the stationary casing is a revolving cylinder 15, spaced from the walls of the casing to form an annular air circulating passage 16 and provided with a series of perforations 17 through which the heated and cold air may circulate freely during the roasting and cooling operation. A shaft 18 is journaled in bearings 19 and 20 and is provided with a gear 21 driven from a shaft 22. The cylinder 15 is open at each end, one end being adjacent to the hopper 6 and the discharge spout 12 to receive and discharge the coffee. At the other end of the cylinder I prefer to provide an extension in the form of a truncated cone 23, with its walls converging from the end of the cylinder outwardly and terminating in a ring 24 that is mounted on the shaft 18 near the bearing 20. This cone is free to revolve with the cylinder. The ring 24 is adapted to register with an opening 25 in the head 3, as shown plainly in Fig. 1.

A drum 26, preferably inclosed within a jacket 26′ of asbestos, or other non-heat conducting material, is secured to the head 3 and covers the opening 25, and mounted in the end of this opening are a series of gas burners 27, at suitable intervals apart, preferably arranged in a circle around a central opening 28 having a valve 29 for regulating the flow of air into the drum. These burners are connected by pipes 30 with a suitable gas supply pipe 31 having a controlling valve 32. A branch pipe 33 leads from the gas supply pipe to a point near the opening 28, which may be ignited through said opening to supply a flame for igniting the main burners as they may be required, each burner having an ordinary gas cock 34 so that as many burners may be used in the operation of the machine as seems necessary. The burners are arranged opposite the opening 25 and preferably spaced the length of the drum 26 therefrom, and the air entering the opening 28 will be thoroughly heated and will pass through the opening 25 into the roasting cylinder, while the burner flames will be spaced a sufficient distance from the cylinder to prevent scorching of the coffee or the delivery of gas to that portion of the cylinder in which the coffee is being treated.

For the purpose of increasing the suction and drawing the heated air into the revolving cylinder, I prefer to provide a series of wings or blades 35, mounted on the inner walls of the cone 23 and preferably triangular in form, tapering gradually from their inner toward their outer ends. These blades, in the operation of the cylinder, will greatly increase the roasting efficiency of the machine without adding materially to the expense of construction. There may be any suitable number of these blades, according to the size of the cone, but I have found the number and shape shown to be productive of the best results. The interior of the roasting cylinder is also preferably provided with agitating blades 36, extending lengthwise and diagonally therein, serving to keep the coffee stirred up and aid in exposing it to the heated or cool air.

In the bottom of the casing 4 is a hinged section 37, which will collect the flying refuse material from the roasting cylinder and allow for its convenient removal from the machine.

For the purpose of cooling the coffee after the roasting operation, I prefer to provide a trunk 38 at one end of the casing between its walls and the cone 33, said trunk being curved in cross section to fit the space between the casing and cylinder and connected with a pipe 39 leading to a suction fan 40. A valve 41 is provided in this pipe 39 and normally will be closed during the roasting operation. When the coffee is roasted and it is desired to cool the berries, the valve 41 will be opened and also the valve 10, while the valve 11 will be closed. The fan 40 will then be set in motion and currents of cold air will be drawn in through the branch pipe 8 and the opening 7 into the interior of the roasting cylinder and will flow in and around the coffee and through the perforations in the revolving cylinder before reaching the trunk 38. The cylinder will be revolved during this cooling process and all parts of the coffee berries will be exposed to the action of the cool air.

I claim as my invention:—

1. A roaster comprising a casing having an exhaust or vent opening, a cylinder mounted to revolve within said casing and having perforations in its walls and spaced from the walls of said casing and also provided with a filling opening through which the material to be roasted may be delivered, said cylinder also having an air intake opening, a drum communicating with said opening and having an air intake opening, means for heating the air in said drum, and means for creating a suction through said cylinder and increasing the circulation of hot air therethrough.

2. A roaster comprising a casing having an exhaust or vent opening, a cylinder mounted to revolve within said casing and having a filling opening and an open end, a drum communicating with the open end of said cylinder and having an air intake, a series of burners mounted to heat the air in said drum, and a series of suction blades mounted to revolve with said cylinder and create a suction of hot air through the open end of said cylinder.

3. A roaster comprising a casing having an exhaust or vent opening, a cylinder having perforations in its walls and provided with an intake opening and mounted to revolve within said casing and having one end in the form of a truncated cone, a drum communicating with the open end of said truncated cone and having an air intake and burners for heating the air within said drum, and a series of suction blades mounted on the walls of said truncated cone and operating to increase the circulation of hot air through the open end of said cylinder and through the material within said cylinder.

4. A roaster comprising a casing having an exhaust or vent opening, a cylinder mounted to revolve within said casing and spaced from the walls thereof and having a filling opening and perforations in its walls and also having an open end, a drum communicating with said open end and having an air intake and burners for heating the air within said drum, the heated air from said drum entering said cylinder and passing through the perforations therein and circulating around said cylinder and through the material to be roasted, and a cold air trunk mounted to draw cold air into the space between said cylinder and said casing.

5. A roaster comprising heads mounted in parallel relation and spaced apart and a jacket secured to said heads and forming a stationary casing, the wall of said casing having a vent opening therein, a cylinder mounted to revolve within said casing and spaced from the walls thereof and forming an annular passage, said casing having perforations in its walls, and an open end, a drum mounted in one of said casing heads and communicating with the open end of said cylinder and having an air intake opening, a series of burners mounted adjacent to said drum, the air entering said drum being heated and means for sucking the heated air into the open end of said cylinder and through and around the material therein.

6. A roaster comprising a casing having a vent or exhaust pipe therefor and a hopper mounted at one end of said casing and having a branch pipe leading to said exhaust pipe, valves for said exhaust pipe and said branch pipe, a cylinder mounted to revolve within said casing and having perforations in its walls and spaced from the walls of said casing to form an annular air passage, said cylinder also having an opening communicating with the discharge opening of said hopper, said cylinder being also provided with an open end and means for directing currents of hot air into said open end, the air flowing through said perforations and the material within said cylinder and circulating in the annular passage between said cylinder and casing, a cold air trunk communicating with said annular passage, a suction fan connected with said air trunk, a valve normally closing the passage through said trunk, said trunk valves and said branch pipe valve being opened to allow currents of cold air to flow into said cylinder and through the perforations therein to cool the material in said cylinder.

7. A roaster comprising a casing having an exhaust or vent opening, a cylinder mounted to revolve within said casing and having perforations in its walls and spaced from the walls of said casing and also provided with a filling opening, said cylinder also having an air intake opening, a cone encircling said opening, a drum communicating with said cone, means for heating the air in said drum, a circulation of air being established from said drum through said cylinder.

8. A roaster comprising a casing having an exhaust or vent opening, a cylinder mounted to revolve within said casing and having perforations in its walls and spaced from the walls of said casing and also provided with a filling opening, said cylinder also having an air intake opening, an imperforate wall encircling said opening, a heating drum communicating with said cylinder through said wall, means for heating the air in said drum, a circulation of heated air being established through said drum into said cylinder.

In witness whereof, I have hereunto set my hand this 22nd day of April, 1913.

RUSSELL HOLMAN.

Witnesses:
EDWARD A. PAUL,
GENEVIEVE E. SORENSEN.